United States Patent [19]
Geisler

[11] 3,972,144
[45] Aug. 3, 1976

[54] FISHING ROD AND REEL CASE
[76] Inventor: Francis E. Geisler, 236 "I" Ave., Nevada, Iowa 50201
[22] Filed: Aug. 25, 1975
[21] Appl. No.: 607,295

[52] U.S. Cl. ................................ 43/26; 150/52 R
[51] Int. Cl.² ..................................... B65D 65/02
[58] Field of Search ...................... 43/26; 150/52 R

[56] References Cited
UNITED STATES PATENTS

| | | | |
|---|---|---|---|
| 679,422 | 7/1901 | Heritage | 43/26 |
| 1,385,695 | 7/1921 | MacCormack | 150/52 R |
| 2,854,775 | 10/1958 | Kleckley | 150/52 R X |
| 3,575,327 | 4/1971 | Harrison | 150/52 R X |
| 3,851,689 | 12/1974 | Kohls | 150/52 R |

*Primary Examiner*—Donald F. Norton
*Attorney, Agent, or Firm*—Henderson, Strom & Sturm

[57] ABSTRACT

A protective case for carrying and storing assembled fishing rods and reels, including a rectangular body portion having partitions forming elongated compartments running parallel to its length.

A fishing rod and reel sack having a rectangular body portion having a top and bottom with the sides and one end attached together. Elongated compartments run parallel to the length of the rectangular body portion and are adapted to hold the greater portion of a fishing rod. A bottom portion is connected to the end of the bottom layer adjacent the compartment open end. A pair of side flaps are attached to and extend laterally in opposite directions from the bottom portion. The flaps are folded laterally over each other and over the exposed fishing rod and reel ends. The end portion is connected to the other end of the bottom portion and is folded longitudinally over the folded flaps. Tie strings are attached to the flaps and end portion for securing the flaps and end portion about the body portion. Straps are attached to the case in longitudinally spaced relation for securing the case in a rolled-up configuration.

9 Claims, 7 Drawing Figures

U.S. Patent   Aug. 3, 1976   3,972,144
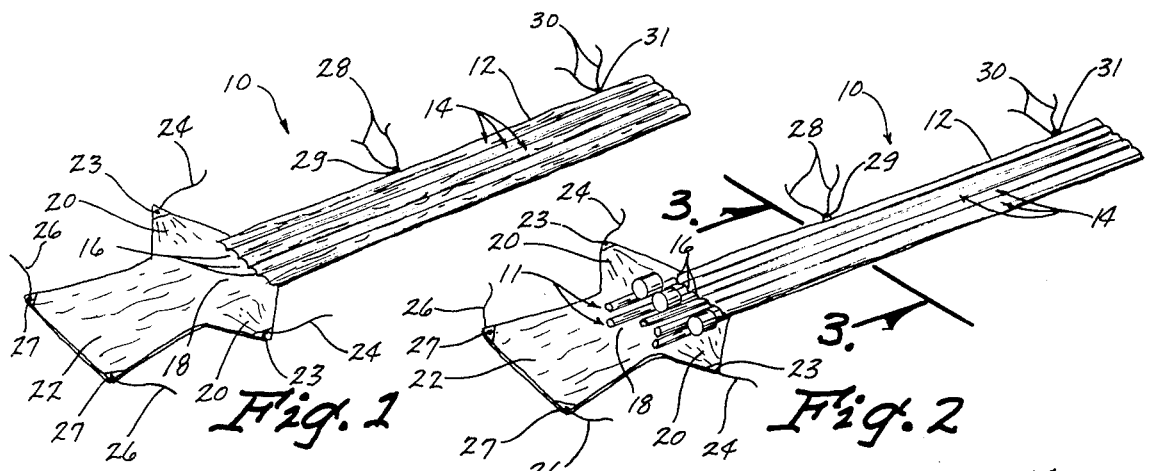
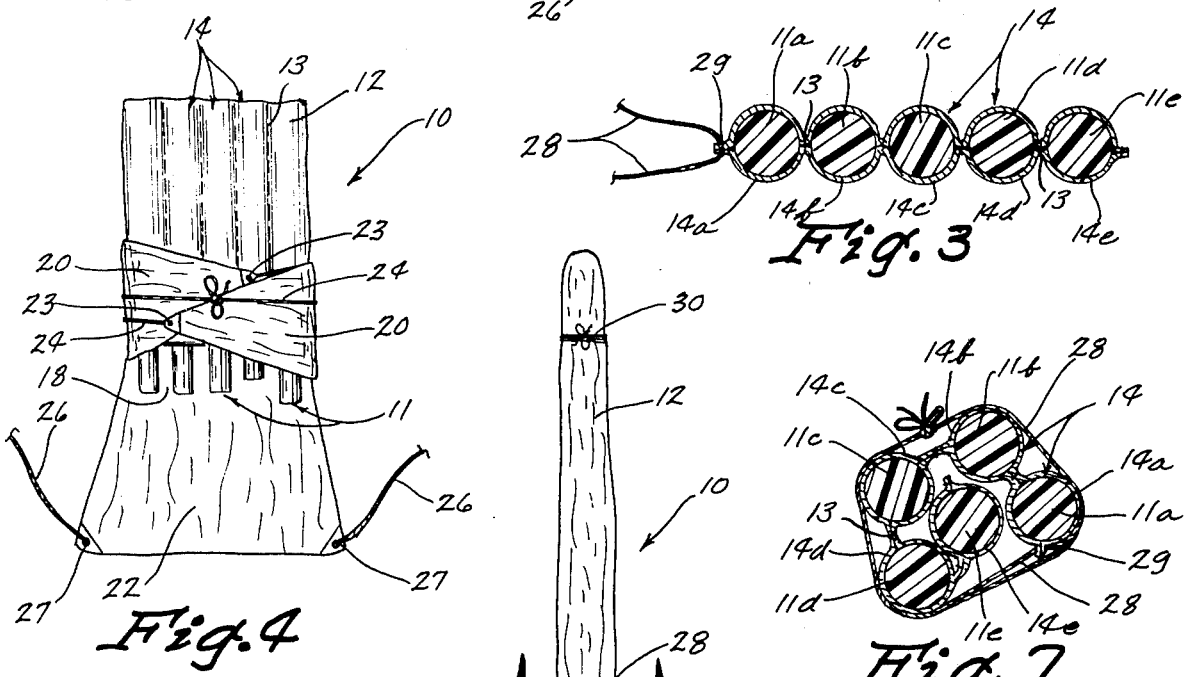
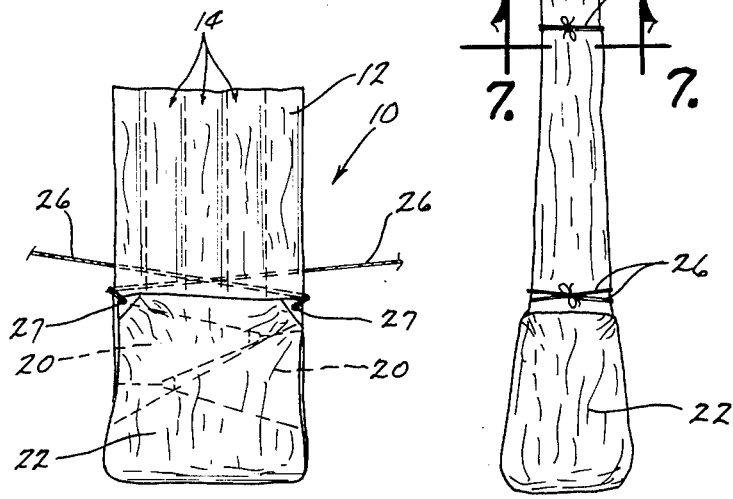

FISHING ROD AND REEL CASE

BACKGROUND OF THE INVENTION

The present invention relates, in general, to cases for carrying and storing fishing tackle; and, more particularly, to a protective case for the carrying and storing of a plurality of assembled fishing rods and reels.

Portable, flexible cases for the carrying and storing of single fishing rods are well known. Most cases generally permit the carrying of a single rod intact unless it is of extreme length. These cases generally consist of rigid tubes having removable caps on one or both ends for inserting the fishing rod. Some cases will even permit the carrying of the fishing rod and reel attached as a unit. These cases typically have an elongated front tubular portion in which the rod is placed, and a rear tubular portion with an oval top to receive the rod handle and the reel. Near the bottom of the case is a zipper, or other suitable closing device, to allow the case to be opened to insert and remove the rod and reel.

While this type of case is satisfactory, when only one rod and reel is used by the fisherman, in many instances it would be convenient for the fisherman to have several rods and reels in the same case. This would greatly simplify the handling of a large number of rods and reels and allow them to be within easy access when fishing on shore or off shore in a boat.

Typical of the cases for the carrying and storage of several rods and reels is the type disclosed by Harrison in U.S. Pat. No. 3,575,327 and Kleckley in U.S. Pat. No. 2,854,775.

Harrison discloses a single sheet on which a rod and reel are attached by tie strings and aligned opposite each other with the sheet being rolled up through its length and secured by additional tie strings.

Kleckley discloses a case comprised of pockets with pouches arranged alternately in which the rods and reels are placed. The pouches have a zipper slot which provide the opening for the rod and reel to be inserted or removed from the case. The case may be rolled up and held by tying tapes.

In both the Harrison and Kleckley inventions, when the case is full, the rods and reels form an alternate arrangement where the reels are positioned beginning at one end of the case, then to the other end and then returning to the first end. With this arrangement, the case forms a rigid non-pliable structure. Many times because of the shape and size of an automobile trunk, it would be very helpful to be able to bend and form the end of the fishing rod around an obstacle in order to either place it directly in the trunk or to position it inside the trunk. This feature would not be available with the type of carrying cases disclosed in either Harrison or Kleckley.

Frequently, while fishing on shore and particularly while fishing in a boat, it is desirable to bring along several fishing rods and reels with full tackle already on them. However, if the rods and reels are not separated, they may be easily entangled and possibly damaged by accidentally stepping on them as they lay in the grass or on the boat bottom. Therefore, it is a great advantage if each fisherman could keep his individual fishing equipment together and separate from everyone else. Further, the use of a fishing rod and reel case for several individual rods and reels would be helpful. However, the case may present a problem when the fisherman desires to change to a different rod and reel, since it may have to be completely unrolled and the tie strings untied or an indiscriminate unzipping of pockets in order to locate a particular rod and reel. This would be a particularly serious problem with several people in the boat, thereby greatly reducing the amount of usable area for such an operation. Therefore, it would be very desirable if a fishing rod and reel case was adapted for the quick and easy removal and replacement of a rod and reel in the case while the case is occupying a minimal amount of space.

Further, it would be desirable if the case would allow all the reels and a portion of the rod to be seen when it was partially opened in order to make the selection easier.

SUMMARY OF THE INVENTION

The above and other disadvantages of the prior art fishing rod and reel cases are overcome in accordance with the present invention by providing a front rectangular body portion having a top and bottom layer with the sides and one end attached together. Partitions forming elongated compartments run parallel to the length of the front rectangular body portion and form compartments In which the fishing rod is placed.

A bottom portion on which the fishing rod handle and the reel rests is formed at the second end of the top and bottom layers, directly behind the apertures, which are in alignment with the elongated compartments. The rods are inserted through the apertures into the elongated compartments. An end portion comprised of a single layer of material extends rearwardly from the bottom portion and has tie strings which secure the end portion of the rods and reels.

Flaps are attached to and extend laterally from the bottom portion. The flaps are folded over the top of the bottom portion and enclose the fishing rod handle and reel; and, also, gather the fishing rods and reels together. Tie strings are attached to the flaps for holding flaps securely against the rod handles and the reel. After the flaps are in place, the end element is folded up over the flaps and secured by its tie strings. Straps are attached to the case which are used to hold the case in a rolled up configuration which permits easy transporting and carrying.

It is, thus, an object of the invention to provide a fishing rod and reel carrying case which is economical and simple to manufacture.

It is a second object of the invention to provide a rod and reel carrying case which is simple and flexible to use.

A third object of the present invention is to provide a fishing rod and reel case which is capable of storing a plurality of full-length fishing rods and reels without having to disassemble the rod, reel and line.

A fourth object of the present invention is to provide a fishing rod and reel case which allows easy and quick access to an individually selected fishing rod and reel.

Another object of the present invention is to provide a fishing rod and reel case which is flexible and allows the ends of the fishing rods, when positioned in the case, to be slightly flexed.

Other objects, advantages, and novel features of the present invention will become apparent from the following detailed description when viewed in conjunction with the accompanying drawings.

BRIEF DESCRIPTION OF THE DRAWINGS

The appended drawings illustrate the invention, wherein:

FIG. 1 is a perspective view of the fishing rod and reel case invention;

FIG. 2 is a perspective view of the fishing rod and reel case of this invention with fishing rods and reels inserted into the case;

FIG. 3 is an enlarged cross-sectional view taken along line 3—3 of FIG. 2, and showing the compartment structure of the invention;

FIG. 4 is an enlarged fragmentary plan view of the invention showing the side flaps tied together around the case;

FIG. 5 is an enlarged fragmentary plan view of the invention showing an end element folded over the side flaps;

FIG. 6 is a plan view of the invention showing the case as it would appear when it is secured; and FIG. 7 is an enlarged cross-sectional view taken along line 7—7 of FIG. 6.

DESCRIPTION OF THE PREFERRED EMBODIMENT

As shown in FIGS. 1 and 2, the fishing rod and reel case, as generally depicted as 10, is comprised of a front rectangular body portion 12, having elongated compartments 14, and apertures 16 at one end of compartments 14. A bottom element 18 is secured to the front rectangular body portion 12 and contains side flaps 20 to which are connected tie strings 24 at reinforcements 23. An end element 22 projects rearwardly from the bottom element and also contains tie strings 26 connected at reinforcements 27. Also, straps 28 and 30 are disposed at reinforcements 29 and 31 along the front rectangular body portion 12 for securing the front rectangular body portion 12 in a rolled-up configuration.

Specifically, a front rectangular body portion 12 may be constructed from lightweight, flexible, preferably waterproof material, and is formed from two layers, having both sides and one end attached together. The length of the front body portion 12 is flexible, being dependent primarily on the length of the poles to be inserted. In the preferred embodiment, the front portion 12 is approximately 14 inches wide and 66 inches in length, which is of sufficient length to allow typical fresh water fishing rods to be inserted without breaking them at a joint. However, an over-length rod may be inserted, merely by breaking the rod at a joint and folding both sections together before inserting them into the front body portion 12.

Partitions 13 (FIG. 3), forming elongated compartments 14, run parallel to the length of the front body portion 12, and may be made by stitching the top and bottom layers together, or forming seams as by a heating method, forming the front body portion 12 (FIG. 3). Each compartment 14 is approximately three inches wide, which is sufficient to allow poles having large line guides to be easily inserted. At the second end, where the top and bottom layer forming the front rectangular body portion 12 are not attached, apertures 16 are formed providing access points into which fishing rods 11 may be inserted into the elongated compartments 14.

Directly behind the apertures 16, the bottom element 18 (FIG. 1) extends rearwardly and is constructed of a single layer of the type of material used to form the front rectangular body portion 12. The bottom element 18 forms a bed on which the exposed ends of the fishing rod handles may rest after the rods are inserted into the elongated compartments 14. The bottom element 18 is approximately 7 inches in length, extending rearwardly from the apertures 16, and 14 inches wide; thus, providing adequate area for the fishing rod handles to rest thereon. It will be noted, the width of the body 12 and the bottom 18 are the same, although this is not critical.

Attached to the sides of the bottom element 18 are the side flaps 20 which extend outwardly adjacent to the apertures 16 and directly opposite each other from the outer edges of the bottom element 18. In the preferred embodiment, the side flaps 20 are triangular in shape, since this design forms the best overlapping structure. However, differently shaped flaps 20 may be used, including rectangular and square. In the present embodiment, the lateral extent of the flaps 20 is approximately 7 inches, and each flap 20 forms an isosceles triangle with a base of approximately 14 inches in length. The overall size of the flaps 20 is variable with the only requirement being that they extend over the exposed fishing rod handles and reels when they are folded over the top thereof (FIG. 4). Attached to the side flaps 20 are tie strings 24, which pass through a small reinforcement 23 near the apex of the side flaps 20 for a purpose hereinafter described.

Extending rearwardly from the bottom element 18 is the end element 22, which may be constructed of a single layer of material of the type used to form the bottom element 18. The end element 22 must have a length that will allow it to be folded rearwardly up and over the exposed ends of the fishing rod handles and reels 11 to completely cover same, and to enclose and cover the side flaps 20 (FIG. 5). In the preferred embodiment, the end element 22 extends about 10 inches beyond the bottom element 18 and again has an approximate width of 14 inches. The end element 22 also contains tie strings 26 attached to its two free corners by having the tie strings pass through a reinforced corner hole 27 as discussed above in reference to the tie strings 24. Straps 28 and 30 disposed at reinforcement points 29 and 31 along the front body portion 12. In the preferred embodiment, two straps are shown; however, the number is flexible with their intended use being to hold the front body portion 12 in a rolled-up configuration for transporting and storing the case 10.

After the fishing rods and reels have been inserted into the front rectangular body portion 12, the side flaps are laterally crossed over, one on top of the other, the exposed portions of the fishing rod handles and reels 11 to cover them in a circular arrangement as shown in FIG. 4. Tie strings 24 are then wrapped around the case and tied together to secure the flaps 20 and to hold the rods and reels in the arrangement of FIG. 7. Then, the end element 22 is folded rearwardly up over the remaining exposed portions of the fishing rod handles and reels and over the tied side flaps 20. The tie strings 26 (FIG. 5) are wrapped around the case and tied togehter to hold the end element 22 securely in place. Straps 28 are then wrapped around the front rectangular body portion 12 thus gathering the fishing rods together and securely holding them in a closely gathered, flexible arrangement (FIG. 7).

The resulting structure allows the top of the case in which the upper portion of the rods extend, to be flexed and bent. This is very helpful in fitting the case into a small area such as the trunk of a car or underneath the seat of a boat.

When it is desirable to use the case 10, whether on land or in a boat, the straps 28 and 30 and the end element 22 may quickly be untied, leaving only the flaps 20 tied together. This allows a quick and easy shifting of a fishing rod and reel by only untying the flaps 20 with the case still rolled up. For subsequent use, the flaps 20 may readily be unloosened.

Because of the elongated compartments 14 and the flexible nature of the case 10, the fishing rods and reels will tend to gather together if the case is placed in the curvature of the boat's bottom. The case 10 would take up only a minimum amount of boat space and allow the quick changing of a fishing rod and reel merely by putting the old one in the case and pulling out a new one. It is to be noted that the partitions 13 (FIG. 3) are of sufficient width and flexibility such that the body 12 can be formed in a circular manner with the compartments 14 resting together somewhat to form a very compact bundle.

Furthermore, when the case is being used on a boat or in a place where there is restricted movement or area available, only the side flaps 20 need to be used to hold the case together with the end element 22 and straps 26 being left untied. This will allow the changing of a fishing rod and reel easily and quickly, simply by untying the side flaps and inserting the old rod and reel and removing the new rod and reel and retying the side flaps. Further, this arrangement will take up a minimum amount of space in the boat.

I CLAIM:

1. A protective case for carrying and storing assembled fishing rods and reels, comprising:

a body portion of a flexible material having a top and bottom layer with the sides and one end of said top and bottom layers attached together;

partitions forming elongated compartments, running parallel to the length of said body portion, each compartment having an open end and a closed end and adapted to hold the greater portion of a fishing rod, with the reel end remaining exposed;

a bottom portion connected to the end of said bottom layer adjacent said compartment opened ends, and on which the exposed reel ends may rest;

a pair of side flaps, each side flap attached to and extending laterally from said bottom portion in opposite directions, said flaps being foldable laterally over each other and over the exposed fishing rod and reel ends;

an end portion connected to the outer end of said bottom portion and extended further away from said open ends, said end portion foldable longitudinally over said folded flaps;

tie means attached to said flaps and said end portion for securing said flaps and said end portion about said bottom portion; and strap means attached to the case in longitudinally spaced relation for securing the case in a rolled-up configuration.

2. A protective case for carrying and storing assembled fishing rods and reels as defined in claim 1, wherein said partitions comprising a plurality of laterally spaced seams extended longitudinally of said bottom portion.

3. A protective case for carrying and storing assembled fishing rods and reels as defined in claim 1, wherein said partitions are of a flexible nature whereby said bottom portion can be formed into a circular arrangement with said compartments nesting with each other.

4. A protective case for carrying and storing assembled fishing rods and reels as defined in claim 3, further wherein said side flaps have a triangular formation with the apex thereof extended outwardly beyond the sides of said bottom portion, the lateral extent of each flap substantially equal to the width of said bottom portion.

5. A protective case for carrying and storing assembled fishing rods and reels as defined in claim 3, further wherein said end portion has a width substantially equal to the width of said bottom portion and a length sufficient to completely cover said folded side flaps.

6. A protective case for carrying and storing assembled fishing rods and reels, as defined in claim 3, further wherein said side flaps have a triangular formation with the apex thereof extended outwardly beyond the sides of said bottom portion, the lateral extent of each side flap substantially equalling the width of said bottom portion; and still further wherein said end portion has a width substantially equal to the width of said bottom portion and a length sufficient to completely cover said folded side flaps.

7. A protective case for carrying and storing assembled fishing rods and reels as defined in claim 1, further wherein said side flaps have a triangular formation with the apex thereof extending outwardly beyond the sides of said bottom portion, the lateral extent of each flap substantially equal to half the width of said bottom portion.

8. A protective case for carrying and storing assembled fishing rods and reels as defined in claim 1, further wherein said end portion has a width substantially equal to the width of said bottom portion and a length sufficient to completely cover, said folded side flaps.

9. A protective case for carrying and storing assembled fishing rods and reels as defined in claim 1, wherein said body portion is substantially rectangular in configuration when said case is unrolled and resting on a flat surface.

* * * * *